United States Patent Office 3,024,125
Patented Mar. 6, 1962

3,024,125
CEMENT COMPOSITION
William M. Lee, Ambler, Pa., assignor to Pennsalt Chemicals Corporation, Philadelphia, Pa., a corporation of Pennsylvania
No Drawing. Filed Feb. 13, 1959, Ser. No. 792,979
19 Claims. (Cl. 106—287)

This invention relates to cement compositions utilizing a silica sol as the cementing or bonding agent.

The use of a silica sol as the bonding agent in cement compositions has been proposed in the past. In early attempts to use silica sol for this purpose the sol was allowed to set or gel by dehydration, or the gelling was hastened by the addition of various electrolytes such as magnesium sulfate or magnesium silicofluoride. When the sol is allowed to set by dehydration, the setting takes place too slowly to be practical and furthermore, the mechanical strength of the cements is too low for most applications. The addition of electrolytes such as magnesium sulfate was found to hasten the setting, but the mechanical strength of the cured cements is as low or even lower than strengths obtained when the sol is gelled by dehydration.

In copending application Serial No. 712,078, filed January 30, 1958, and now U.S. Patent No. 2,914,413, for Cement Composition and Method of Preparation by Robert S. Mercer, cement compositions are described utilizing a silica sol as a bonding agent and certain alkali metal silicates in solid form as the setting agent for the silica sol. In sharp contrast to the silica sol cements previously suggested, the cements described in application Serial No. 712,078 have excellent mechanical strength. In conjunction with their high mechanical strength, these cements display excellent resistance to acid corrosion and may be used in applications where they are exposed to boiling concentrated sulfuric, hydrochloric acid and the like, being markedly superior both in mechanical strength and in acid resistance to the so-called "water glass" cements based upon the use of a sodium silicate solution as the bonding or cementing agent.

It has been found, however, that the cements of the aforementioned application Serial No. 712,078 are not entirely suitable for some uses, apparently as a result of the alkali metal ions introduced into the cement by the alkali metal silicate setting agent. For example, under some circumstances, exposure to water may reverse the setting process and weaken the finished cement. If, for example, a cast article is soaked for a considerable time in a small amount of water, alkali metal silicate will leach out of the cement and the water will become strongly alkaline. The alkali can then attack the cement and weaken it. An application in which this type of attack may occur is in the case of a grinding wheel in which the abrasive grit is bonded with a silica sol set by means of a sodium silicate setting agent. In wet grinding operations, the grinding wheel is immersed in a water bath or sprayed with water, and under these circumstances leaching out of the sodium silicate will make the water alkaline, which will in turn attack the cement and may cause rupture at high speeds.

Another example where the relatively small alkali metal content of the cements of the aforesaid application may be disadvantageous is in the case of electrical applications (e.g., fabrication of resistors, potting of electrical components, etc.) where apparently the small amount of alkali metal silicate contained in the cement will cause undesired variations in electrical properties. A further example of undesirable side effects apparently arising out of the small alkali metal content of such cements is in applications where the cement is used as a bond for structural shapes or aggregate composed of silica. Apparently at high temperatures, e.g., above 500° F., alkali metal tends to flux the silica structure at the cement-silica interface, causing failure.

It has now been found, in accordance with the present invention, that improved cements having the excellent mechanical strength characteristic of the cements of application Serial No. 712,078 but free from the above-mentioned disadvantages, may be provided by employing a silica sol as the bonding agent for the cement and a setting agent for the silica sol comprising an organic base silicate which is relatively slowly soluble in water, preferred organic base silicates being the quaternary ammonium silicates, amine silicates, quaternary phosphonium silicates and ternary sulfonium silicates. Such cements have excellent mechanical properties and acid resistance and in addition have markedly increased water resistance, improved electrical properties and resistance to fluxing at high temperatures.

The silica sol employed in the cements of the present invention should be an aqueous silica sol, which for the vast majority of applications should have a colloidal silica concentration of at least 10% by weight and preferably at least 20% by weight. There is apparently no upper limits for the silica content, provided the sol is liquid but sols of 45% silica by weight or more are difficult to prepare and not generally available.

Many methods for preparing aqueous silica sols are known. One of the earliest processes of commercial importance is described in U.S. Patent No. 2,244,325 to Bird according to which a dilute sodium silicate solution is passed through a bed of an acidic ion exchange resin, such as an acid treated carbonaceous zeolite, to reduce the alkali metal ion content of the original silicate solution to low values, such that the final $SiO_2:Na_2O$ ratio is at least 10:1 and preferably higher, such as 50:1 or 100:1. This yields a dilute aqueous silica sol which may then be concentrated by evaporation.

Another suitable method for the prepartion of a silica aquasol is described in U.S. Patent 2,375,738 to White according to which a sodium silicate solution is neutralized with acid to precipitate silica gel, after which the gel is synerized, crushed, washed to remove soluble salts, covered with a dilute alkali (e.g., 0.1% NaOH) solution and then heated in an autoclave at temperatures between 80° C. and 200° C. for several hours.

More recently, improved silica sols have appeared such as those described in U.S. Patents 2,574,902 and 2,577,485. According to the process described in these patents, an aqueous silica sol, such as that produced by the process of the Bird Patent 2,244,325 referred to above, having colloidal silica particles of less than 10 millimicrons in size, is treated to increase the average size of the silica particles. The sols produced by these processes are stable at concentrations of 20% to 35% by weight of colloidal silica, contain silica particles which are usually remarkable uniform in size, and are preferred in the practice of the invention.

Other suitable processes for producing aqueous silica sols are described in U.S. Patents 2,680,721, 2,601,235, 2,668,149, and 2,650200. It is to be understood, of course, that the invention is not limited to any particular method for preparing the silica sol, although as pointed out above, the sols produced by certain methods are preferred.

As is well known, silica sols, as distinguished from alkali metal silicate solutions, contain a low alkali concentration. As mentioned in the Bird Patent 2,244,325, in the case of silica sols containing sodium ions, a $SiO_2:Na_2O$ ratio of about 10:1 is the practical upper limit of sodium concentration. As stated by Bird, higher $SiO_2:Na_2O$ ratios such as 50:1 or 100:1 are preferred.

According to U.S. Patent 2,574,902 referred to above, the desirable range of $SiO_2:Na_2O$ ratios is given as 60:1 to 130:1, while in U.S. Patent 2,577,485 sols having $SiO_2:Na_2O$ ratios ranging up to 500:1 are described. In the preferred sols of the invention, considering cost as well as desirability, the alkali content of the sol expressed as the $SiO_2:Na_2O$ weight ratio ranges from about 50:1 to 300:1. While lower ratios can be used (e.g., down to 10 $SiO_2:1Na_2O$ in the case of sols containing sodium ions), such sols are not as desirable because they introduce appreciable amounts of alkali, such as sodium ions, into the cured cement which is undesirable for the reasons pointed out above. Higher ratios can also be employed, e.g., a $SiO_2:Na_2O$ ratio of 500:1, but such extremely low alkali content sols are usually rather expensive. Some minimum content of alkali, in the form of sodium, potassium, lithium, or ammonium ions is desirable and indeed considered essential for imparting good stability to the sol. The stabilizing effect of a small amount of sodium ions is discussed in U.S. Patents 2,244,325 and 2,574,902, referred to above. The alkaline reacting sols described by these patents are thus preferred for their stability. In the case of sols stabilized by sodium ions, maximum stability is usually obtained between a pH of about 8 to 10 although fairly stable sols are obtainable at lower and higher pH values. Acid reacting silica aquasols are generally considerably less stable and thus not as desirable or as convenient to use.

A characteristic which distinguishes silica sols from materials which have sometimes been loosely referred to as silica sols, such as sodium silicate solutions, is the fact that the silica content of a silica sol of appreciable silica concentration may normally be precipitated as a silica gel by adding alkali such as NaOH, to the sol. An aqueous sodium silicate solution, on the other hand, is merely made more alkaline by adding NaOH: a silica gel does not precipitate. Similarly, a sodium silicate solution which has been partially neutralized by acid, but not otherwise treated, may contain some material which might be classified as colloidal silica, but such a partially neutralized solution will not normally precipitate silica gel when NaOH is added but will merely become more alkaline, the precipitated silica going back into solution as sodium silicate.

Broadly speaking, the setting agent for the silica sol may be any organic base silicate which is slowly soluble in water. Preferably the organic base silicate should have approximately the same rate of solubility and approximately the same degree of solubility in water as sodium silicates which have an $Na_2O:SiO_2$ ratio in the range of 1:1 to 1:4.2. By an organic base silicate is meant a silicate that may be prepared by the reaction of a strong organic base such as a quaternary ammonium hydroxide or a tertiary amine with a reactive form of silica such as a silica gel. Such silicates may be regarded as analogous to the alkali metal silicates wherein the alkali metal ions have been replaced by a non-metallic function derived from a strong organic base. In common with the metal silicates, the organic base silicates may exist in a variety of forms, both hydrated and anhydrous, crystalline and vitreous, and in a variety of molecular configurations depending upon the ratio of the organic function to the silicate function.

Particularly preferred are the quaternary ammonium silicates which may be considered as derived by the replacement of the alkali metal ion of an alkali metal silicate with a quaternary ammonium group, i.e., an ammonium group in which the quaternary nitrogen atom has four carbon to nitrogen bonds. These may be prepared by reacting a quaternary ammonium hydroxide with silica gel. Typical quaternary ammonium silicates suitable for use in the invention include tetramethyl ammonium silicate, benzyltrimethyl ammonium silicate, phenyltrimethyl ammonium silicate, and N,N,N',N'-tetramethyl piperazinium silicate. Quaternary ammonium silicates of this type are described in U.S. Patent 2,689,245, and in Journal of Physical and Colloid Chemistry, v. 55, 1951, pages 187–195, R. C. Merrill and R. W. Spencer. Particularly preferred are the tetraalkyl ammonium silicates in which the alkyl groups may have 1 to 4 carbon atoms and may be the same or different, such as tetramethyl ammonium silicate, tetraethyl ammonium silicate, ethyltrimethyl ammonium silicate, etc.

Another particularly suitable class of organic base silicates are the amine silicates which may be prepared by the reaction of strongly basic amines such as trimethylamine or guanidine with a reactive form of silica. Still another class of organic base silicates suitable for use in the invention are the quaternary phosphonium silicates (i.e., those in which the quaternary phosphorus atom has four carbon-to-nitrogen bonds) which may be prepared, for example, by the reaction of a quaternary phosphonium hydroxide such as tetramethyl phosphonium hydroxide with a reactive form of silica. Still another suitable class of organic base silicates are the ternary sulphonium silicates (i.e., those in which the sulfur atom has three carbon-to-nitrogen bonds) which may be prepared by the reaction of a ternary sulphonium hydroxide such as trimethyl sulphonium hydroxide with a reactive form of silica.

In all cases, the organic base silicate should be employed in solid form, preferably as a finely-divided powder, e.g., a powder of 100 mesh fineness or more.

It has been found that in common with the alkali metal silicates described in the aforementioned application, the organic base silicates apparently have a unique gelling action upon the silica sol through which cements of excellent mechanical strength are obtained. Although the mechanism of the setting of the silica sol is not fully understood, it is believed that the setting agents of the invention produce a relatively slow, orderly precipitation of the gel in a manner which leads to high bond strengths. It is believed that the marked improvements in water resistance, electrical properties, and high temperature performance obtained with the setting agents of the invention is due to the fact that these setting agents introduce no alkali metals into the cement.

The composition of the filler is not critical. It may consist of any material which is essentially insoluble in the water of the silica sol and which is substantially inert with respect to the sol. It will be apparent that a great variety of substances fall within this classification such as silica, various insoluble silicates including many minerals, such metallic oxides as the iron oxides, titania, zirconia and calcined alumina, such insoluble salts as barium sulfate and calcium carbonate, silicon carbide and iron carbide, and such metals as iron and copper. Sulfur can be used and carbon such as powdered graphite. Organic fillers such as ground walnut shell and woodflour may be employed. Even certain organic compounds as powdered naphthalene, which is water-insoluble, may be employed to obtain special effects; for example, naphthalene may be leached from the cement after hardening to provide a structure of controlled porosity.

Typical specific filler materials that may be advantageously employed in the cements of the invention include quartz ($SiO_2$), beryl (3 $BeO \cdot Al_2O_3 \cdot 6SiO_2$), olivine [(Mg, Fe)$_2SiO_4$], zircon ($ZrSiO_4$), wollastonite ($CaSiO_3$), asbestos ($H_4Mg_3Si_2O_9$), nepheline syenite [(Na, K)$_2 \cdot Al_2O_3 \cdot 2SiO_2$], amblygonite ($AlPO_4 \cdot LiF$), fluorspar ($CaF_2$), alumina ($Al_2O_3$), and silicon carbide (SiC).

Some materials, of course, are obviously unsuitable as fillers, such for example as soluble materials, such as sugar which would dissolve in the silica sol, or soluble salts such as sodium chloride and magnesium sulfate which are unsuitable both because they would dissolve in the sol and because they would interfere with the proper action of the setting agent.

The wide variety of fillers which can be employed suggests many of the uses to which the cements of the invention can be put. Depending on the filler employed, for example, cements of the invention may be used for the making of tiles, bricks, high temperature-resistant tubes and molded shapes, paint-like thin coatings, electrical resistors (with organic or ceramic overglazes applied subsequent to forming), filters, partly metallic bearings, partly metallic structures of high electric resistance but good thermal conductivity, magnets, etc., and cements suitable for use in chemically resistant construction, in particular cements which have high resistance to aqueous acids. As pointed out previously, the cements of the invention, because of their markedly improved water resistance, electrical properties and high temperature performance, will be suited for many applications where these properties are important in which the cements of application Serial No. 712,078 would not be entirely practical.

As with other cements, the strength of the cured cements of the invention is dependent to some degree on the particle size and particle size distribution of the filler. Even where it is desired to include in a cement mass a considerable portion of large aggregate (for example, aggregate of 8 to 20 mesh), for reasons of economy or special purposes (e.g., grinding wheels), some finely-divided filler (for example, from 100 to 200 mesh) should generally be included in order to achieve the maximum strength. In those occasional instances where it is desirable to create a cement mass of low strength, for example, in making molds or cores for casting, fine filler may be omitted.

It is frequently desirable to employ mixed fillers. The mixture may be in terms of particle size, that is, a single composition such as quartz might be used in three particle sizes, including gravel, fine sand and quartz flour. Materials may be included in a mixture for the sake of their shape or porosity or density. Fibrous minerals such as asbestos may be included or laminar minerals such as mica. Minute hollow bubbles which have recently become commercially available may be included. Such "microballoons" composed of phenolic resin or of aluminum oxide can both be used in the cements of this invention to provide lighter structures which are good thermal insulators. Fibre glass and rock wool have been used to make cementitious masses of particular properties. It is quite often desirable to add minor percentages of clay to a cement composition for the sake of the plastic properties it gives to the initial mortar. Materials such as kaolin, allophane, montmorillonite, vermiculite, attapulgite, bentonite, etc., will often improve the workability of a mortar, and may be used if their presence in the final cement mass will not interfere with the use intended.

In preparing the cements of the invention, it is preferred first to mix the particulate filler with the setting agent in the form of a finely-divided powder. Just before use, the dry filler-setting-agent-blend is then mixed with sufficient silica sol to prepare a cement mortar of proper consistency. This method of preparing the cement is preferred since the setting agent is homogeneously blended with the filler in advance, resulting in a more uniform distribution of the setting agent throughout the cement when the silica sol is added. On the other hand, if desired, the silica sol and filler may be blended first and the solid finely-divided setting agent then added to the liquid slurry.

The proportions of the ingredients may vary rather widely depending upon the particular application involved and the type of filler or mixture of fillers employed. In the great majority of cases, the filler will comprise the major proportion by weight of the cured cement composition, although in a few special cases, where fillers of very low density are employed, such as vermiculite, the filler may comprise somewhat less than 50% by weight of the cured cement.

In most applications the weight ratio in the cured cement of solids contributed by filler and those contributed by the combination of the silica sol and the setting agent will range from 97:3 to 80:20 and usually from 95:5 to 85:15. In the great majority of cases, a high filler to silica sol ratio is desirable from the standpoint of minimizing porosity in the cured cement and shrinkage during curing. The silica sols commonly available, as previously pointed out, contain of the order of 30% of $SiO_2$ and the water content of mortar must, of course, be lost by evaporation during curing.

The proportion of organic base setting agent employed may likewise vary. Generally speaking, it should be present in amounts of approximately 0.2% to 15% by weight of the filler, and for most applications in amounts of from 2% to 10% by weight of the filler.

The proportions of the dry ingredients to the liquid silica sol may vary within wide limits depending upon the nature of the filler, its particle size and density, the consistency of the mortar desired, and the silica content of the silica sol. Generally speaking, of course, the amount of silica sol employed must be sufficient to bond the filler into a coherent mass, the optimum ratio of solids to liquid sol being readily determined empirically in each particular case. As an illustration of the wide variation possible in solid-liquid ratio, this ratio may range from 0.5:1 for a filler consisting of asbestos fibers to 6:1 for a filler of a high density material such as zircon. When using primarily silica flour as the filler, and a 30% $SiO_2$ sol, optimum solids to liquid weight ratios are generally within the range of from about 3.0 to 4.0 by weight.

While in any case a single organic base silicate setting agent may be employed, it will often be desirable to employ a mixture of setting agents having different solubility rates. In general, the more rapidly soluble the setting agent, the more rapidly will it set the cement, but on the other hand, the shorter will be the working life of the mortar (that is, the period during which it may be poured into containers, troweled, extruded or the like). With more slowly soluble setting agents the working life is improved but the setting time (that is, the elapsed period until unsupported shapes can be safely handled without special precautions) is increased. To obtain an optimum compromise between working life and setting time, that is, a working life long enough to be practicable and a setting time short enough to be practicable, a mixture of setting agents, one of which is relatively rapidly water-soluble and the other which is relatively slowly water-soluble is advantageously employed.

If desired, the cements of the invention may be cured entirely at ambient temperatures. They require no elevated temperature curing to develop excellent mechanical properties. On the other hand, the cured cement may, if desired, be subjected to a post cure at slightly elevated temperatures, e.g., 60° C. to 100° C. for 1 to 24 hours, or may also be fired at high temperatures, e.g., 600° C. to 1000° C. for e.g., 1 to 4 hours. On firing, the cements of the invention will generally increase substantially in strength. This may be due in part to the fact that the organic moiety is thermally destroyed by such high temperature treatment. In the case of the quaternary ammonium silicate and amine silicate setting agents, both the nitrogen and the organic portion is usually decomposed and driven off from the fired cement. In the case of quaternary sulphonium silicates, ordinarily both the sulfur and the organic portion may be lost, the sulfur probably coming off as $SO_2$ or $SO_3$ unless a material such as calcium carbonate is present which may react with and tie up the sulfur in an insoluble form, e.g., as calcium sulfate. In the case of the quaternary phosphonium silicates, the organic portion is probably carbonized and liberated as $CO_2$ in the presence of air while the phosphorus atom may become bonded in some way in the network of the cement, particularly if a small amount of a material such as calcium carbonate is included in the filler to form, e.g., a calcium phosphate.

The following examples are intended to illustrate the invention:

Example 1

A cement composition is prepared using the following ingredients in the proportions stated:

| | Parts by weight |
|---|---|
| Tetramethylammonium silicate | 3.0 |
| Homer clay (essentially kaolinite) | 8.1 |
| Berkley Sand No. 1 | 24.15 |
| 120 mesh quartz | 114.25 |
| Silica sol | 37.00 |
| | 186.50 |

The tetramethylammonium silicate employed has the probable formula: $(CH_3)_4NHSiO_3 \cdot xH_2O$ and is prepared by the reaction of tetramethylammonium hydroxide and micronized silica gel by the method described in Journal of Physical and Colloid Chemistry, vol. 55 (1951), pages 187–195, and in U.S. Patent 2,689,245. For use in the cement, the crystalline tetramethyl ammonium silicate is ground to a fine powder and mixed with the clay, sand and quartz in the dry state before blending with the silica sol.

The Berkley Sand No. 1 is a quartz sand having the following Tyler screen analysis: 0.0% retained on 20 mesh screen; 46.6% retained on 42 mesh screen; 40.4% retained on 60 mesh screen; 10.7% retained on 80 mesh screen; 1.3% retained on 100 mesh screen.

The silica sol is an aqueous sol of colloidal silica having 30.4% by weight of $SiO_2$ in the form of colloidal silica particles, an $Na_2O$ content by weight of 0.14%, a pH of 8.45, a viscosity of 16.1 centipoises at 22° C. and a density of 1.206 grams per centimeter. This sol may be prepared in accordance with the method described in U.S. Patent 2,574,902.

To make the cement, the dry ingredients are thoroughly blended. The silica sol is then added and mixed to make a mortar. The mortar is cast into 1" cylinders for testing. One set of cylinders is cured at room temperature. Another set of cylinders is cured at room temperature for several days and then cured at 60° C. for 24 hours. A third set of cylinders is cured at 60° C. for 24 hours and then ignited to 700° C. for 8 hours. On heating to 700° C., the organic moiety burns out smoothly, evolving fumes having an odor indicating decomposition of nitrogenous material. The three sets of cylinders cured under the above conditions are then tested for compressive strength with the following results.

| Cure: | Compressive strength, lbs./in.$^2$ |
|---|---|
| Cure at room temperature | 2160 |
| Post-cure at 60° C. | 1820 |
| Ignited at 700° C. | 3180 |

Example 2

A second cement was prepared using the formulation of Example 1 except that the amount of tetramethylammonium silicate is reduced from 6.0 parts to 3.0 parts. The mortar made from this formulation is cast into 1" cylinders, one set being cured at room temperature for several days and then at 60° C. for 24 hours and another set cured at 60° C. for 24 hours and then heated to 700° C. for 8 hours. Compressive strength tests on the cylinders thus cured show the following results.

| Cure: | Compressive strength, lbs./in.$^2$ |
|---|---|
| Post-cure at 60° C. | 1150 |
| Ignited at 700° C. | 1270 |

As may be seen, the smaller amount of setting agent produced a cement of somewhat lower strength.

Example 3

A cement is prepared using the formulation of Example 1 except that instead of using 6 grams of tetramethylammonium silicate there is used 3.0 grams of benzyl trimethylammonium silicate in powdered form (prepared as described in U.S. Patent 2,689,245 and in the above-mentioned article by R.C. Merrill et al.). The cement mortar is cast into 1" cylinders which are cured at 60° C. for 24 hours and then heated to 700° C. for 8 hours. The compressive strength of the cylinder thus cured is found to be 935 lbs./in.$^2$.

The cured cements prepared as in the foregoing examples all display excellent resistance to deterioration when immersed in small amounts of water. In contrast to many of the cements made in accordance with aforementioned application Serial No. 712,078, the water does not become appreciably alkaline, and thus there is no alkaline attack upon the cement.

I claim:

1. A cured cement produced by blending a particulate filler in such proportion that the filler contributes the major proportion of the solids content of the cured cement, an aqueous silica sol containing at least 10% by weight of silica as a binder for said filler in an amount sufficient to bond said filler into a coherent mass, and from .2% to 15% by weight, based on the weight of said filler, of a finely-divided solid organic base silicate which is slowly soluble in water, said filler being essentially insoluble in the water of said silica sol and being substantially inert with respect to said sol.

2. A cured cement produced by blending a particulate filler in such proportion that the filler contributes the major proportion of the solid contents of the cured cement, an aqueous silica sol as a binder for said filler in an amount sufficient to bond said filler into a coherent mass, said sol containing at least 20% by weight of colloidal silica, and from 0.2% to 15% by weight, based on the weight of said filler, of a solid finely-divided quaternary ammonium silicate as a setting agent for said silica sol, said filler being essentially insoluble in the water of said silica sol and being substantially inert with respect to said sol.

3. A cured cement in accordance with claim 2 in which said quarternary ammonium silicate is a tetraalkylammonium silicate in which the alkyl groups contaian from 1 to 4 carbon atoms.

4. A cured cement composition in accordance with claim 2 in which said quaternary ammonium silicate is tetramethylammonium silicate.

5. A cured cement in accordance with claim 2 in which said quaternary ammonium silicate is benzyl trimethylammonium silicate.

6. As a composition suitable for admixture with an aqueous silica sol containing at least 10% by weight of silica to form a cement, the combination of an inert particulate filler blended with from 0.2% to 15% by weight, based on the weight of said filler, of a finely-divided solid organic base silicate which is slowly soluble in water, said filler being essentially insoluble in the water of said silica sol and being substantially inert with respect to said sol.

7. A cured cement consisting essentially of silica produced by blending a filler consisting essentially of silica, an aqueous silica sol containing at least 10% by weight of colloidal silica as a binder in an amount sufficient to bond said silica filler into a coherent mass, and setting agent for said silica sol consisting essentially of a solid quaternary ammonium silicate in an amount of from .2% to 15% by weight based on the weight of said silica filler, said cement having been fired at a temperature sufficient to decompose the organic portion of said quaternary ammonium silicate.

8. As a cement composition, the combination of a particulate filler contributing the major portion of the solids content of the cement, an aqueous silica sol containing at least 10% by weight of silica as a binder in an amount sufficient to bond said filler into a coherent mass, and from .2% to 15% by weight based on the weight of said filler of a solid organic base silicate which is slowly soluble in water as a setting agent for said silica sol, said filler being essentially insoluble in the water of said silica sol and being substantially inert with respect to said sol.

9. As a cement composition, the combination of a particulate filler contributing the major portion of the solids content of the cement, an aqueous silica sol containing at least 10% by weight of silica as a binder for said filler in an amount sufficient to bond said filler into a coherent mass, and as a setting agent for said silica sol, from .2% to 15% by weight based on the weight of said filler of a solid organic base silicate selected from the class consisting of quaternary ammonium silicates, amine silicates, quaternary phosphonium silicates, and ternary sulphonium silicates, said filler being essentially insoluble in the water of said silica sol and being substantially inert with respect to said sol.

10. As a cement composition, the combination of a particulate filler contributing the major portion of the solids content of the cement, an aqueous silica sol containing at least 10% by weight of silica as a binder in an amount sufficient to bond said filler into a coherent mass, and from .2% to 15% by weight based on the weight of said filler of a solid quaternary ammonium silicate as a setting agent for said silica sol, said filler being essentially insoluble in the water of said silica sol and being substantially inert with respect to said sol.

11. A cement composition in accordance with claim 10 in which said setting agent is solid tetraalkylammonium silicate in which the alkyl groups have from 1 to 4 carbon atoms.

12. A cement composition in accordance with claim 10 in which said setting agent is tetramethylammonium silicate in solid form.

13. A cement composition in accordance with claim 10 in which said setting agent is benzyl trimethylammonium silicate in solid form.

14. A cement composition in accordance with claim 9 in which said setting agent is a solid amine silicate.

15. A cement composition in accordance with claim 9 in which said setting agent is a solid quaternary phosphonium silicate.

16. A composition in accordance with claim 6 in which said setting agent is a solid finely-divided quaternary ammonium silicate.

17. A composition in accordance with claim 6 in which said setting agent is a solid finely-divided amine silicate.

18. A composition in accordance with claim 6 in which said setting agent is a solid finely-divided quaternary phosphonium silicate.

19. A composition in accordance with claim 6 in which said setting agent is a solid finely-divided ternary sulphonium silicate.

References Cited in the file of this patent
UNITED STATES PATENTS

| | | |
|---|---|---|
| 2,380,945 | Collins | Aug. 7, 1945 |
| 2,509,026 | White | May 23, 1950 |
| 2,689,245 | Merrill | Sept. 14, 1954 |
| 2,803,566 | Johannsen | Aug. 20, 1957 |
| 2,856,302 | Reuter | Oct. 14, 1958 |
| 2,914,413 | Mercer | Nov. 24, 1959 |

FOREIGN PATENTS

| | | |
|---|---|---|
| 576,808 | Canada | June 2, 1959 |